[11] 3,603,149

| | | | |
|---|---|---|---|
| [72] | Inventor | Ross D. McKown<br>Woodland Hills, Calif. |
| [21] | Appl. No. | 854,843 |
| [22] | Filed | Sept. 3, 1969 |
| [45] | Patented | Sept. 7, 1971 |
| [73] | Assignee | The United States of America as represented by the Secretary of the Army |

[54] ULTRASONIC LIQUID LEVEL INDICATOR
2 Claims, 4 Drawing Figs.

[52] U.S. Cl. .................................................. 73/290 V, 340/244 R
[51] Int. Cl. .................................................. G01f 23/28
[50] Field of Search ..................................... 73/290 V, 67.1, 67.8

[56] References Cited
UNITED STATES PATENTS

| | | | |
|---|---|---|---|
| 3,019,650 | 2/1962 | Worswick...................... | 73/290 V |
| 3,173,291 | 3/1965 | Simjiah........................ | 73/67.1 |
| 3,220,258 | 11/1965 | Rod............................. | 73/290 V |
| 3,335,602 | 8/1967 | Marther....................... | 73/67.1 |
| 2,763,153 | 9/1956 | Simjian........................ | 73/67.8 |

Primary Examiner—S. Clement Swisker
Attorneys—Harry M. Saragovitz, Edward J. Kelly, Herbert Berl and Aubrey J. Dunn

ABSTRACT: A transducer is placed on the outside of a container and used to transmit an ultrasonic pulse through the wall of the container and to detect the reflected ultrasonic pulse. The amplitude reflected pulse is dependent upon the specific acoustic impedance of the container. The specific acoustic impedance of the container is related to the substance in contact with the wall of the container beneath the transducer. By detecting a change in specific acoustic impedance it is possible to determine when the container has been filled to a predetermined level. A cathode-ray tube provides a visual indication of the specific acoustic impedance. A gated output is provided to automatically control the filling process of the container.

PATENTED SEP 7 1971 3,603,149

Ross D. McKown,
INVENTOR

BY Harry M. Saragovitz
Edward J. Kelly
Herbert Berl
Aubrey J. Dunn

ULTRASONIC LIQUID LEVEL INDICATOR

BACKGROUND OF THE INVENTION

This invention relates to liquid level indicators and more particularly to ultrasonic liquid level indicators for use with missile fueling systems. There exists an urgent need for a device which can sense the level of liquid propellant in a container or tank during fueling of a missile system and shut off the propellant flow to the container when the level of the propellant reaches a precise point.

Floats, sight gauges, etc. all failed to provide a system that could automatically stop the flow of the propellant at an exact desired level, i.e., ± one-fourth inch. An ultrasonic method which has been used before on similar problems was considered, but had to be discarded. Briefly, in this method, a transducer was placed at the bottom of a tank and used to measure the time required for a sonic pulse to traverse the distance from the bottom of the tank through the fluid to the liquid air interface. Small changes in the propellant temperature affected the acoustic velocity enough to destroy the accuracy of the method.

In the particular case surrounding the instant invention, the required propellant level was based not on volume, but upon a particular geometric relationship between the fluid level and a convex expulsion piston. To determine the fluid level by volumetric metering was not possible because the precise total volume could not be calculated accurately because of the shape of the container. The desired device must be unmanned during fueling, except for adjustments which could be made from a remote location such as a blockhouse. The desired device must also be able to monitor and control the flow of propellant to any one of a plurality of tanks, selectively, and withstand the temperatures encountered during the test firing of the missile. It is an object of the present invention to provide a device which satisfies the above-specified requirements.

SUMMARY OF THE INVENTION

This device is an ultrasonic liquid level indicator which operates by sensing a change in specific acoustic impedance when a liquid is brought in contact with the inside of a metal container. It can be used for either locating a liquid level or for triggering a "full" signal when the level rises to a predetermined point. A sensing transducer, or transducers, may be attached to the outside of the container in any convenient manner. Ultrasonic pulses are propagated through the walls of the container. The probes sense the amount of the pulses reflected from the inside of the container wall. The amount of the pulse reflected is directly proportional to the specific acoustic impedance.

A cathode ray tube may be used to visually display both the original and the reflected pulses, and thus the specific acoustic impedance, or the cathode ray tube may be gated to supply an instantaneous signal when a particular liquid level is reached. For example, an operator viewing the CRT may manually control the filling process of a container. Likewise, the instantaneous signal may be used to automatically control the filling process of a container.

DESCRIPTION OF THE PREFERRED EMBODIMENT

Figure 1:
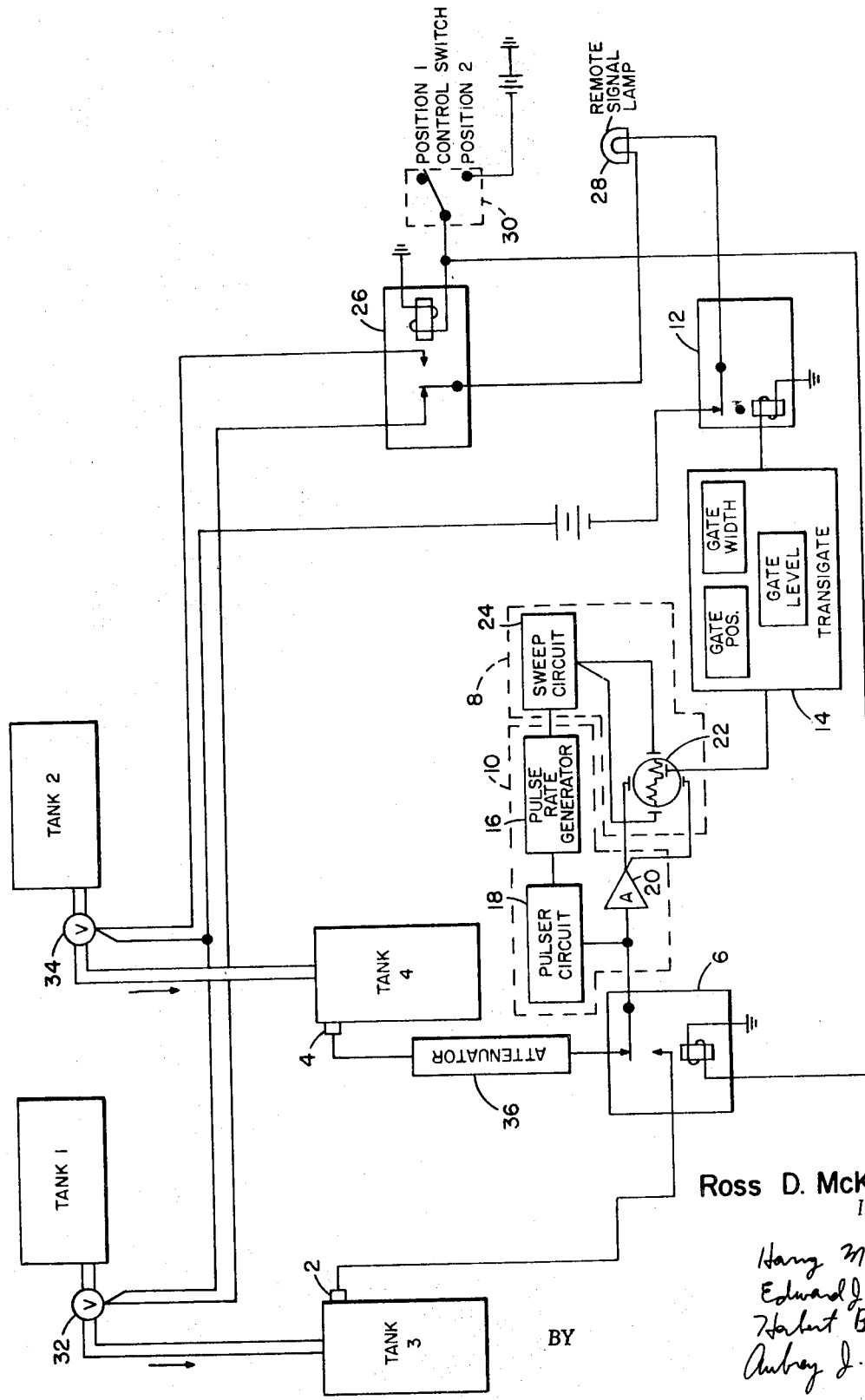
FIG. 1 is a schematic diagram of the present invention.

Referring to the drawing, it is desired to transfer fluid from tank 1 to tank 3 and from tank 2 to tank 4. It is also desired that the level of the fluid in tanks 3 and 4 be detected from a remote location when the level reaches a predetermined maximum fill point. The heart of this invention is Ultrasonic Reflectoscope 8 which is produced by Sperry Products Division of Automation Industries, Inc. Pulser-receiver 10, transigate 14, and quartz crystals (sensors) 2 and 4 are also produced by Sperry.

Figure 2:
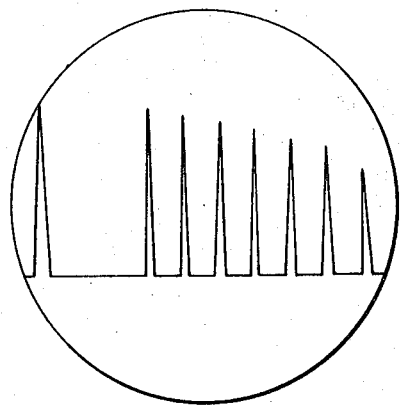
FIGS. 2, 3, and 4 show the image on the cathode ray tub during various phases of the filling process.

Reflectoscope 8 is an ultrasonic transmitter-receiver, transceiver, which operates on the pulse-echo principle in the lower megacycle range. Pulse rate generator 16 is a timing device that sends a signal to both pulser 18 and sweep circuit 24 to initiate circuit operation. The frequency of the rate generator can be varied from about 60 to 600 hertz. The pulse rate generator simultaneously starts the horizontal sweep (time line) across cathode ray tube (CRT) 22 and the pulser. Pulser circuit 18, on command from rate generator 16, provides a high voltage pulse (1000–2,000 volts) to crystal (transducer) 2 or 4 depending on the position of relay 6. This pulse also feeds through amplifier 20 to CRT 22 and appears as a "-pip" at the beginning of the CRT trace. Attenuator 36 is provided between transducer 4 and pulse-receiver 10 so the signals from the transducer may be balanced at the input to the pulser-receiver 10 by varying the attenuation in one input leg. After the initial pulse, the crystal goes "quiet" and becomes a "listening" device for reflected sonic pulses. Received sonic pulses are converted into electrical energy by the crystal and amplified by amplifier 20. Pulse-shaping means 20 rectifies, amplifies, differentiates the received pulse, and supplies the vertical grids of the CRT with a deflection voltage resulting in a vertical deflection of the sweep line, i.e., a "pip." The pip height is proportional to the ultrasonic pulse amplitude. Under the above-stated conditions, a typical trace of the CRT would be as shown in FIG. 2. Each "pip," after the first one, represents an echo from the inside of the container wall. A change in the specific acoustic impedance will cause the reflected pulse to vary in amplitude.

When pulsed ultrasonic waves are propagated through the walls of a metal container the percentage of the pulse reflected from the inside wall (reflectance coefficient) is dependent upon the specific acoustic impedance of the metal and of the substance in contact with the metal. The reflectance coefficient may be calculated from the following formula:

$$R = (Z_2 - Z_1)^2 / (Z_2 + Z_1)$$

Where:
$R$ = reflectance coefficient
$Z = PC$
$P$ = density of substance
$C$ = acoustic velocity in substance
$Z_1$ = specific acoustic impedance of the metal
$Z_2$ = specific acoustic impedance of substance in contact with the metal Air and other gases have extremely low $Z$'s compared with metal, such that $R$ for an empty container is essentially equal to 1.0. $Z$'s for most liquids are in the range such that $R$ is between 0.6 and 0.9, the specific value being calculatable for a know container and contents. These values are independent of wall thickness and ultrasonic frequency. When a reflected pulse pattern is displayed on a CRT, the difference in reflected amplitude is easily discernible.

Transigate 14 is an on-off gate that operates as a selective switch to trigger relay 12, thereby providing the gating control for the fluid level of tanks 3 and 4. The gating circuit 14 samples the echo signal displayed on the CRT, providing an output only when the sampled signal has fallen below a predetermined level. Transigate 14 may be adjusted to monitor any particular pulse displayed on the CRT. The transigate or gating circuit causes a negative deflection of the CRT for the position and width of position being monitored thereby. Accordingly, one is able to visually determine the exact area being monitored by the gating circuit. Once gating circuit 14 is positioned and adjusted for width, any "pip" which occurs within the same time period as the gate will be sensed thereby (see FIG. 3). In the preferred embodiment, the gate level of gating circuit 14 is adjusted such that if the monitored pulse has an amplitude that does not exceed a predetermined value, gating circuit 14 will provide an output which will cause relay 12 to energize (see FIG. 4). When the monitored pulse does not exceed the predetermined level, the tank has been filled to the desired level. Energization of relay 12 causes solenoid valve 32 or 34, depending on the state of relay 26, to deenergize and stop flow into its respective tank. Also, remote signal lamp 28 is extinguished to indicate to the operator that the tank has been filled. For the embodiment shown, with switch 30 in position 1, relays 26 and 6 are deenergized and valve 34 is electrically connected to a power source through the contacts of relay 26, signal lamp 28, and the contacts of relay 12. Fluid flows from tank 2 into tank 4. When the monitored pulse from crystal 4 decreases in amplitude to the predetermined level, tank 4 has been filled and relay 12 energizes, extinguishing lamp 28 and removing power for valve 34 to stop the flow therethrough. The operator has then but to change the position of control switch 30 to automatically fill the remaining tank. As soon as switch 30 is thrown to position number 2, relays 26 and 6 will energize. Quartz crystal 2 will be connected to amplifier 20 and CRT 22. Since tank 3 is empty, all "pips" appearing on CRT 22 will be above the predetermined minimum amplitude (FIG. 3) and will cause gating circuit 14 to deenergize relay 12. With relay 12 deenergized, solenoid 32 will open and fluid will flow from tank 1 to tank 3. When the fluid level in tank 3 reaches the level of the sensor, quartz crystal 2, the specific acoustic impedance of the tank will change and, as explained before, gating circuit 14 will provide an output to energize relay 12 and cause the solenoid to close.

Figure 3:
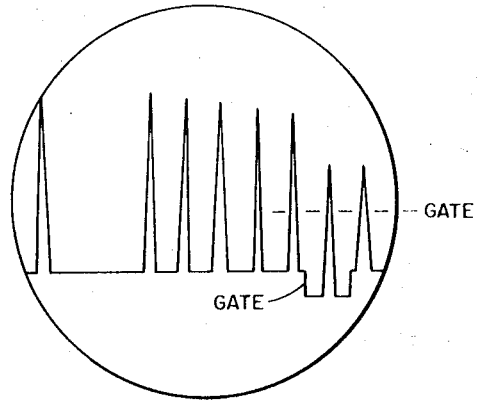

When the system is initially placed in operation and before gating circuit 14 is utilized the CRT picture is as shown in FIG. 2. This pattern represents several round trips of the ultrasonic pulse through the wall of the empty container. Each "pip," from left to right, appears a little shorter due to attenuation and losses at the material interfaces. After the transigate or gating circuit is activated and adjusted, the pattern on the CRT appears as shown in FIG. 3. The gating circuit is positioned at the fifth or sixth "back echo" from the container because each succession echo is more sensitive to energy losses at the container interfaces. The gate level is adjusted so that if the "pip" within the gage drops below a predetermined level, relay 12 will be activated. This level is indicated by the dotted line in FIG. 3.

Figure 4:
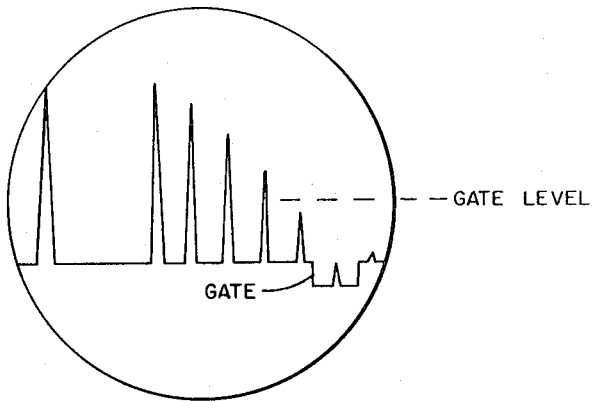

When the tank being filled reaches the full level the "pipe" representing back echoes on the CRT are immediately diminished to the pattern shown in FIG. 4. This is because of absorption of ultrasonic energy into the substance filling the tank. Since the "pip" monitored by the gate is now below the predetermined gate adjustment, the gate supplies a signal which causes relay 12 to be energized when in turn causes the solenoid valve to be closed to stop flow into the particular tank being filled.

I claim:

1. An ultrasonic liquid level indicator system comprising: first transducer means for determining the specific impedance of a container, said transducer means being mounted on the wall of said container and having an output indicative of said specific acoustic impedance; transceiver means having a sweep circuit and having a cathode ray tube display means coupled to said first transducer output for displaying said acoustic impedance; a gating circuit connected to said transceiver for providing an output signal when the vertical deflection of said cathode ray tube sweep is less than a predetermined value; an ultrasonic pulsing means having a pulse rate generator, a pulse circuit, and a receiver amplifier; said transceiver sweep circuit being connected to said pulse rate generator and to horizontal plates of said cathode ray tube whereby a pulse from said generator causes said cathode ray tube to sweep horizontally; said receiver amplifier being connected to said transducer output and to vertical plates of said cathode ray tube for coupling said transducer output thereto, and said pulser circuit being connected to said pulse rate generator and said first transducer for supplying an ultrasonic pulse to said transducer; and said receiver amplifier receiving a signal from said first transducer indicative of said ultrasonic pulse reflected from the inside wall of said container, and coupling said reflected energy to said cathode ray tube for indicating said specific acoustic impedance.

2. A liquid level indicator system as set forth in claim 1 and further comprising second transducer means for determining the specific acoustic impedance of another container, said second transducer means being mounted on the wall of said other container and having an output indicative of said acoustic impedance; remote control means including first and second relays, said first relay alternately connecting said first and second transducers to said receiver amplifier and said pulser circuit in response to a control signal; and said second control means relay being responsive to said gating output for providing a remote indication and on-off control signal.